United States Patent
Silver et al.

(10) Patent No.: US 7,035,393 B1
(45) Date of Patent: Apr. 25, 2006

(54) SYSTEM AND METHOD FOR CREATING A PERSONAL DIRECTORY

(75) Inventors: Edward M. Silver, Atlanta, GA (US); Maria Adamczyk, Alpharetta, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 186 days.

(21) Appl. No.: 10/241,016

(22) Filed: Sep. 11, 2002

(51) Int. Cl.
*H04M 1/00* (2006.01)

(52) U.S. Cl. .................... 379/355.03; 379/355.01; 379/355.02; 379/355.04

(58) Field of Classification Search ............ 379/93.23, 379/140, 142.06, 142.1, 142.17, 201.01, 379/201.04, 242, 355.01, 355.02, 355.03, 379/355.05; 707/2, 4, 5; 455/418, 550.1, 455/565
See application file for complete search history.

(56) References Cited

U.S. PATENT DOCUMENTS

| | | | | | |
|---|---|---|---|---|---|
| 5,903,632 | A | * | 5/1999 | Brandon | 379/93.23 |
| 6,049,796 | A | * | 4/2000 | Siitonen et al. | 707/3 |
| 6,091,808 | A | * | 7/2000 | Wood et al. | 379/201.04 |
| 2002/0159574 | A1 | * | 10/2002 | Stogel | 379/93.01 |

* cited by examiner

*Primary Examiner*—Jefferey F. Harold
(74) *Attorney, Agent, or Firm*—Thomas, Kayden, Horstemeyer & Risley LLP

(57) ABSTRACT

This invention relates to methods for the automatic generation of personal directories that list calls made to or from a specific phone number. The methods comprise the steps of receiving a telephone number related to a call placed or received on a user's phone, storing the phone number along with other information such as the date and time of the call, organizing the information in a useful manner, as well as incorporating other information related to the number such as a name and address, and finally providing the organized list of numbers in the form of a personal directory.

29 Claims, 5 Drawing Sheets

SYSTEM AND METHOD FOR CREATING A PERSONAL DIRECTORY

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

FIELD OF THE INVENTION

The present invention generally relates to the interception and storage of information about a telephone call. The present invention more particularly relates to the interception, storage and retrieval of information regarding telephone calls.

BACKGROUND

In an effort to maximize one's ability to be "connected to the world", individuals have acquired many personal communication devices. These include home phones, business phones, cell phones, pagers, faxes, personal digital assistants (PDA's), and the like. Unfortunately, as a person acquires more of these devices, it becomes increasingly difficult for those who are trying to contact them to remember each of the phone numbers for the various devices. As such, individuals have extensive phone lists, and often multiple lists, one for each of their phones. They may have a phone list at home, one at work, one in the car for use with their car or cellular phone, and perhaps a phone list on their PDA. These lists may all be the same, but often differ based on the needs associated with a particular device. For example, a person has a contacts list at the office comprising business numbers for which the person would have no need at home when the person generally calls social contacts.

A further problem arises when a person meets someone new. When a new number becomes important enough to be stored in a phone list, it may be necessary to update three or four different lists and keep track of which new numbers have been added to each list. This can be a time consuming and frustrating process. Often a person develops a new contact and loses the number before entering it into a phone list. It will then take considerable time to find that number again and properly enter it in the phone list.

When a person receives a call, the person can obtain the caller's phone number and sometimes their name from a caller identification unit. The person must then write the number down, and take the list to work, home, and the car to update the persons various address books. If a person wants more information about the contact, such as their address, even more time is spent looking it up in the phone book or on the Internet.

Additionally, an individual's phone records may be organized differently for different uses. For example, phone lists are often alphabetical, but an individual may have a list at home that lists numbers in order of call frequency. With our relatives or close friends at the top of the list, their numbers are easily accessible. At the office, contacts might be listed by the company they work for, rather than by the individual's name. It may also be desirable to list personal and business contacts separately.

Local companies are required by law to keep records of phone calls placed and received from each phone number. Currently these records are not easily accessible by the "owners" of these phone numbers. Phone companies track calls made to and from each phone number and store them for a predetermined length of time. Customers often get a list of long distance calls made from their number, but local calls and long distance calls made to their number are not included. One would find it desirable if those records were accessible as a means for tracking their phone activity and as a personal directory of their frequently called numbers and the numbers of those who call them.

It would also be helpful to have additional information regarding the numbers a person calls and is called from. Additional information such as a caller's name and address or other such information would eliminate the need to manually search for this data before updating phone lists.

SUMMARY

Embodiments of the present invention relate to methods and systems for providing a telephone directory. One embodiment of a method and system according to the present invention comprises receiving telephone call data associated with a telephone call to or from a user's phone, storing the call data with call data from other calls to and from the user's phone, organizing the data according to a predetermined format, and allowing a user to access the data in the form of a personal telephone directory comprising call data from calls made to or from the user's phone.

The present invention presents a method that provides automatic generation of a personal directory based on the calls made to and from a particular phone number. A feature and advantage of the present invention is that it provides a custom phone book which contains only the names and phone numbers of those that call or are called from a particular number.

This process happens automatically and without the intervention of the individual whenever a call is placed or received. The information collected and provided in the personal directory may be organized in any manner desired truly creating a custom phone book. Certain numbers that are called frequently may be highlighted so they stand out from the other numbers. Alternatively, frequently called numbers may be listed in a separate list somewhere within the directory for easy access.

Further features and advantages of the present invention are set forth below.

DETAILED DESCRIPTION

As used in this specification, a "user" is the person for whom a personal directory is being created. This refers to an individual, a business, or any entity with a phone or phones for which call data is stored and delivered in phone book form.

As used in this specification, a "provider" or "service provider" is the entity that provides the personal directory for the user. The provider commonly will be a telephone or other telecommunications company, as they have immediate access to a user's phone records and call data; however, as will be explained in further embodiments, the provider may be a separate entity which stores and organizes call data for the user.

As used in this specification, a "database" is any means for storing phone numbers and other call information. This will typically be a computer with storage capability.

As used in this specification, "call data" refers to the information received when a call is placed or received. Examples include the phone number of the called or calling party, and the date and time, both for initiation and termination, of the call.

As used in this specification, "additional call data" refers to any information later associated with a phone number. This typically includes a party's name, address, type of contact, and any information retrieved from external sources.

Embodiments of the present invention provide methods for receiving and tracking phone call information, as well as storage and retrieval of the information. An embodiment of the present invention comprises a method for receiving information about a telephone call, storing that information with information relating to other telephone calls, and retrieving the information in the form of a personal telephone directory.

In embodiments of this invention, calls may be placed or received on landline or cellular telephones, including residential and business phones. Any phone may be employed to carry out the present invention. Furthermore, if several phones are connected in a local network, such as a PBX system, call information may be tracked for the individual numbers or for the system as a whole.

Figure 1:
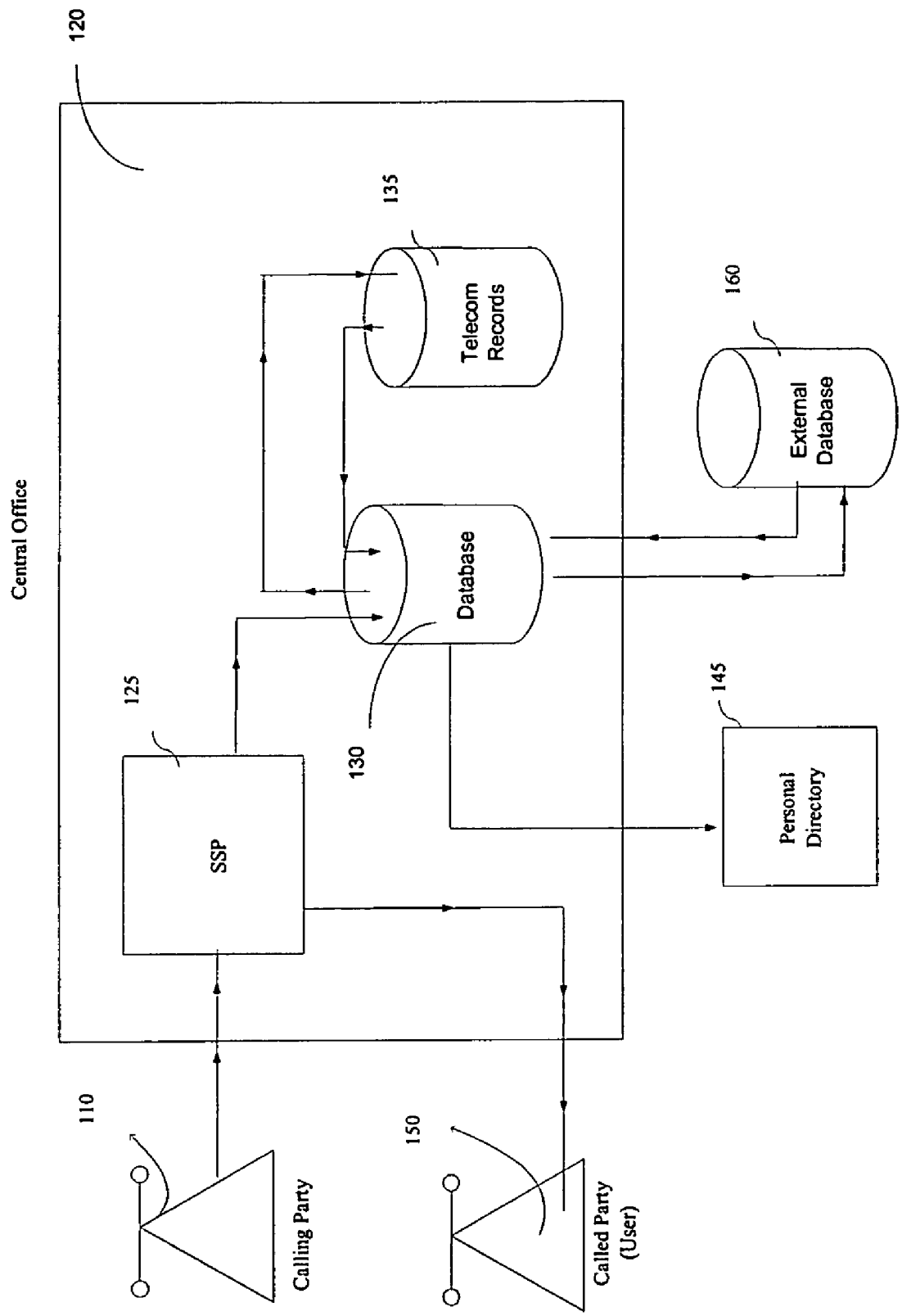
FIG. 1 is a diagram of a system of an embodiment of the present invention where a call is placed from a third party to a user.

FIG. 1 shows an embodiment of the present invention where a call is placed to a user, and the user's telecommunications provider is the service provider of the personal directory. In this embodiment a caller 110 places a call. Call data, which comprises the telephone number of the calling and called party in the embodiment shown, is transmitted from the phone originating the call to the telecommunications provider's central office 120. The telecommunications provider may be a traditional phone company, or a cellular provider. The central office 120 receives the phone call request, processes the request through a service switching point (SSP) 125 and connects the caller to the called party 150. This process takes place whether the call is placed from landline phones or cellular phones. Though some of the instrumentalities may be different, the general process and outcome are the same. As such, the example of a land based phone system will be discussed to illustrate the embodiments of this invention.

When a call comes through the central office 120 for routing, call data is extracted, for example, by the switch 125, and the call data is stored in a database 130. In addition to the number of the called and calling party, call data may also comprise the date and time the call was initiated and terminated.

Once the called party's number is stored in the database 130, a database program will manage the database and organize the information. The first task for the database program is to associate additional call data with the number.

In the present embodiment the database program retrieves additional call data from the telecommunications provider's database 135. This additional call data comprises information such as names, addresses, and whether the contact is a personal or business contact. If there is no additional call data associated with the phone number in the telecommunications provider's internal databases 135, the database program queries external databases 160. For example, the database program conducts Internet based searches or searches of other telecommunications provider's databases to locate this information. Once additional call data is associated with the phone number, all this information is stored in the database 130. Then, the database program generates the personal directory 145 by organizing the information and delivering it to the user.

In a preferred embodiment of the present invention, the database 130 stores call data until it is time to create the personal directory. The call data may be stored and organized in any manner desired. For example, call data may be stored in chronological order, or calls may be grouped according to the calling party's number. Alternatively, calls may be stored in as-received order and organization of call data then takes place when the database program delivers a personal directory to a user.

Figure 2:
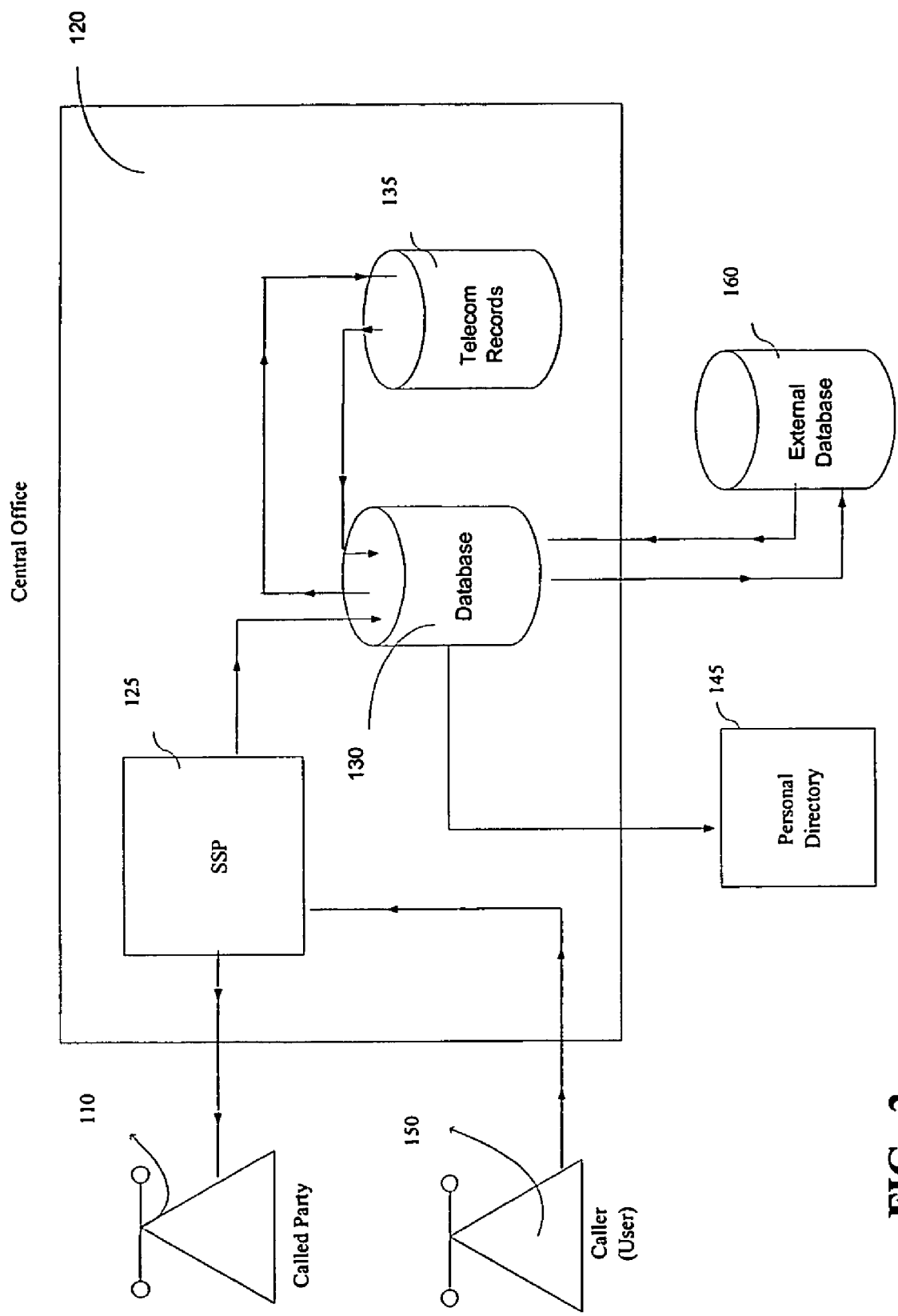
FIG. 2 is a diagram of a system of an embodiment of the present invention where a call is placed from a user to a third party.

FIG. 2 shows another embodiment of the present invention in which call data is tracked for outgoing calls from the user. This embodiment is essentially the same as FIG. 1 except the user 150 places a call to a third party 110. The call is first routed through the telecommunications provider's central office 120. A switch 125 routes the call to the called party, while transmitting the call data to a database 130 for storage and organization, where the process is identical as that for the embodiment shown in FIG. 1.

Figure 3:
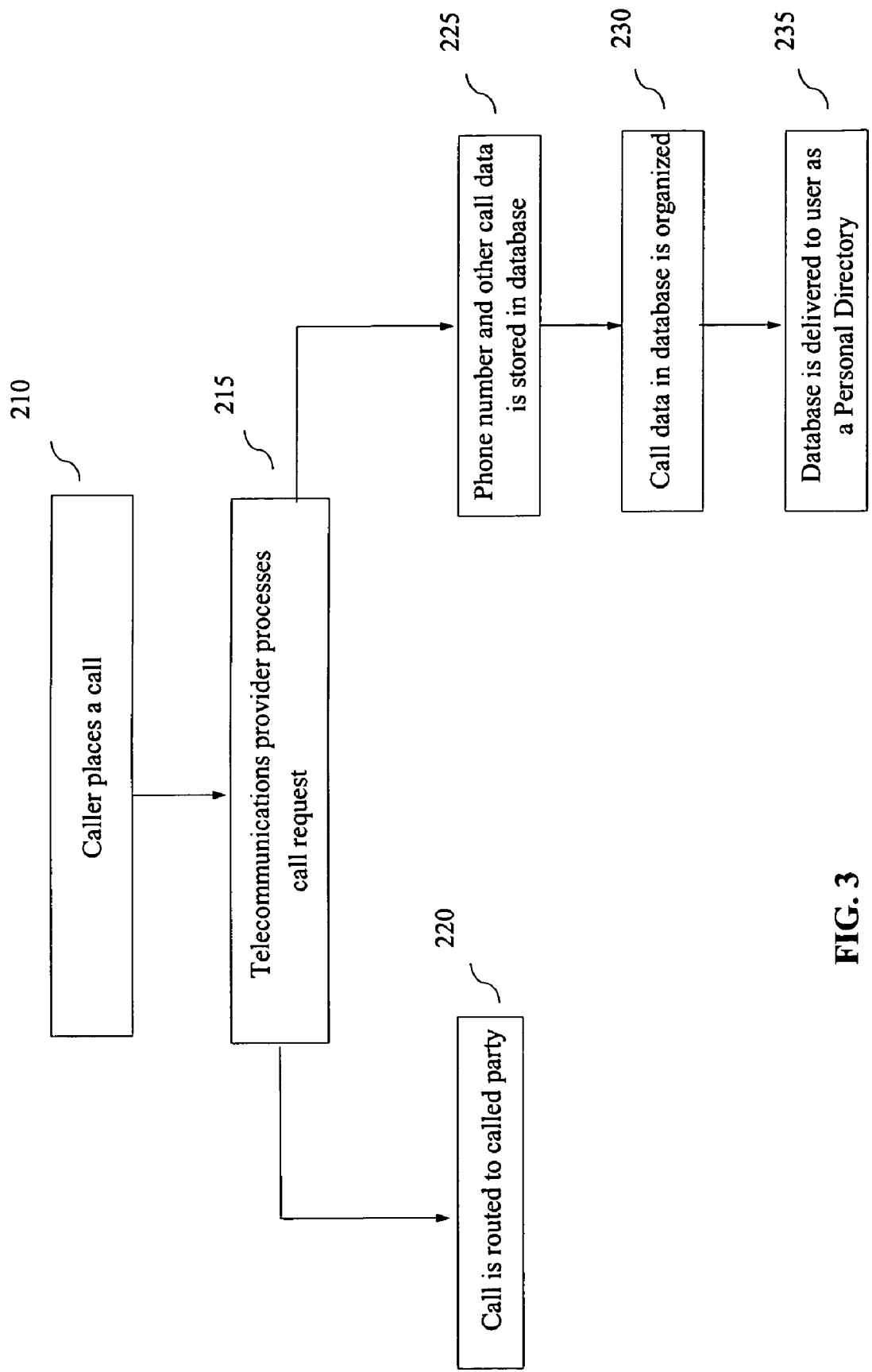
FIG. 3 is a flowchart of an embodiment of the present invention.

FIG. 3 shows a flowchart of an embodiment of the present invention. A caller places a call 210 and the telecommunications provider receives the call request 215. The telecommunications provider then routes the call to the called party 220 and stores the call data associated with the call in a database 225. As discussed above, the user can be the caller or the called party. This process occurs for every call that is placed or received by the user. The database then organizes call data 230 and provides the organized call data to the user 235.

Figure 4:
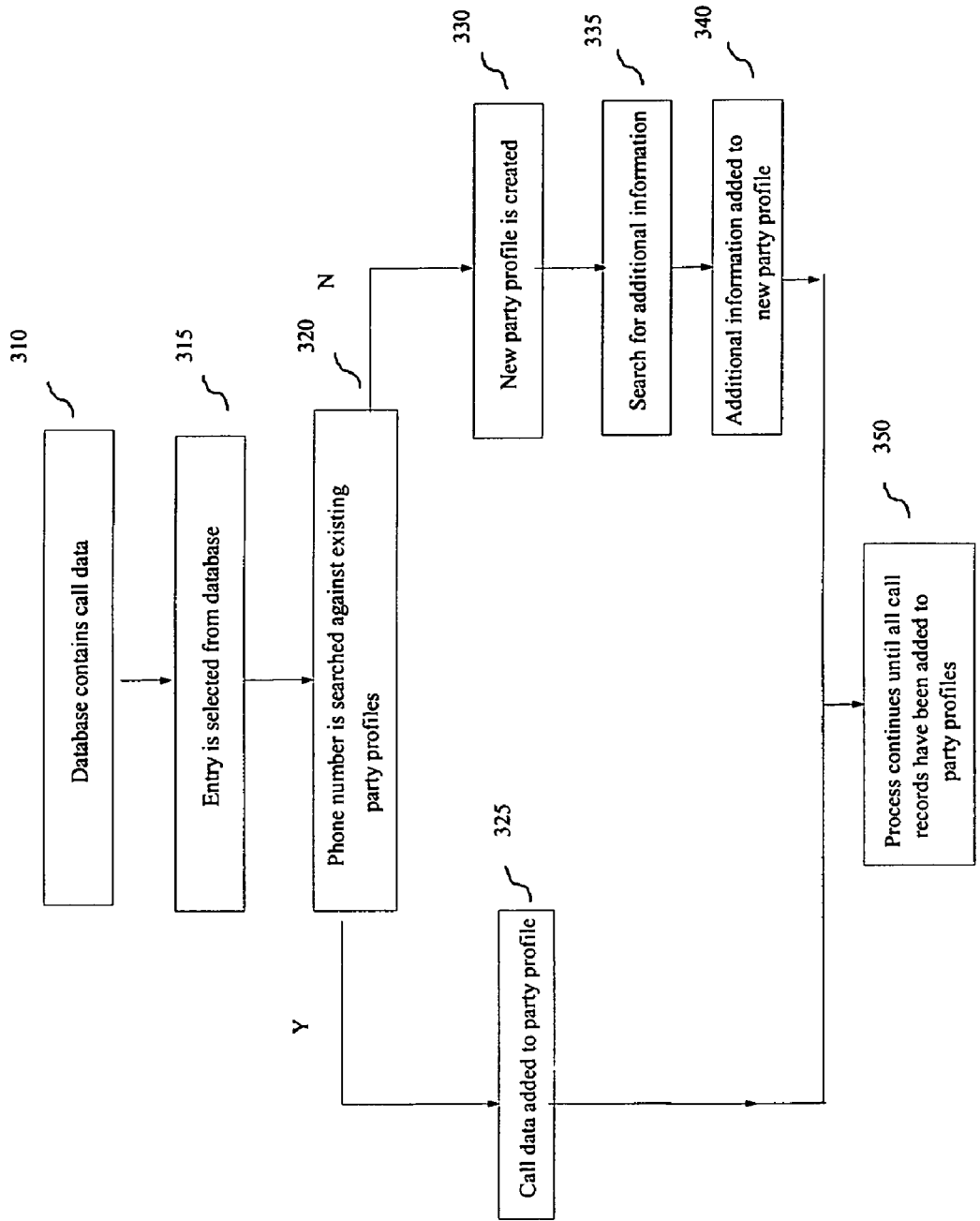
FIG. 4 is a flowchart of an embodiment of the present invention.

FIG. 4 shows an embodiment of a method of organizing call data according to the present invention. The database containing call data 310 is organized by the database program which selects an entry from the database 315, and searches against existing party profiles 320 in the database, which comprise at least one of the number, date and time as well as additional call data associated with that particular number. If a party profile exists, the database program adds the call data to the party profile 325. If a party profile does not exist, the database program creates a new party profile 330. Then, the database program conducts a search, either through internal telecommunications provider databases, or through external databases, for additional call data to associate with the party profile 340. This process is repeated until all numbers in the database have been associated with a party profile 350.

In another embodiment of the present invention, a computer at the user's location receives and stores the call data. For example, a personal computer that is functionally connected to the user's phone line provides the database storage and database program operations. The computer may be located in a user's home, office or may be a portable computer functionally connected to a wireless network.

Figure 5:
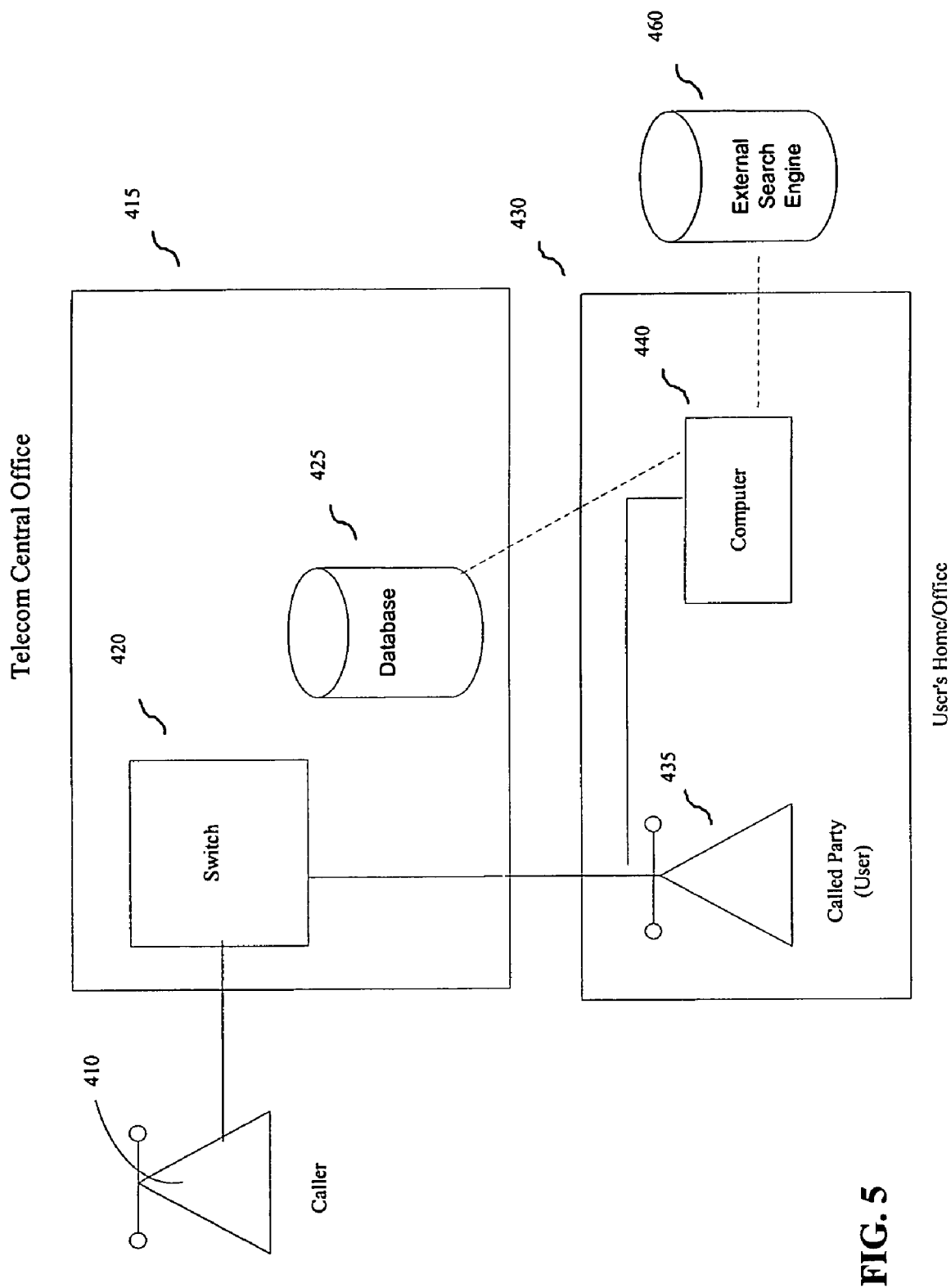
FIG. 5 is a diagram of the system of an embodiment of the present invention wherein a user intercepts and stores call data on a personal computer.

Referring to FIG. 5, when a caller 410 places a call, the call is routed by a switch 420 at the telecommunications provider's central office 415 to the called party's phone 435. In the embodiment shown, the called party 435 is the user. A computer 440 functionally connected to the user's phone line 435 intercepts the call data from the calling party 410. The computer 440 provides the same functions as the telecommunications provider in the previous embodiment comprising storage, organization and providing the personal directory. This includes searching the telecommunications provider's database 425 and external databases 450 for additional call data. In an alternate embodiment, the user's computer stores the call data temporarily for later transfer to a service provider's database where the call data is organized and a personal directory is generated.

In embodiments of the present invention, when a phone call is placed or received, the phone number associated with the call is received by the service provider and sent to a storage database. As previously discussed, this call data comprises the phone number and possibly other information such as the date and time the call was placed. Every time a call is placed or received from the user's phone, call data is added to the database. This is true for any of the embodiments discussed above, either when the service provider maintains the database, or the call data is stored by the user on a personal computer.

In embodiments of the present invention, call data is stored for a pre-determined period of time, such as a year. In other embodiments, the call data is stored indefinitely. The information may also be stored on a monthly or quarterly basis, however, to fully appreciate a user's call habits a longer period of time is preferred. There are some numbers that an individual may only call once a year, such as a distant relative on their birthday, or a physician for a yearly physical. In order for calls such as these not to get dropped from the database, longer storage times are desirable. As such, in a preferred embodiment the storage time is one year. This allows the personal directory to accurately reflect a user's calling pattern without undue storage burdens on the service provider.

In embodiments of the present invention, additional call data comprising information not intercepted directly from the call during routing is associated with the phone numbers in the database. As discussed previously, the database program conducts a search for this information in other databases. However, the service provider, be it a telecommunications provider or third entity, may not have additional records for a particular phone number within their internal databases. In this event, the database provider searches external information sources in order to locate additional call data to associate with a number. There are several information sources including the Internet for which additional call data may be searched and retrieved. For example, "reverse directories", where a number is entered and a corresponding name and address are provided, could be particularly helpful to glean further data associated with a phone number.

In an embodiment of the present invention, the database program searches for additional call data and associates it with the phone number when the phone number is initially retrieved and stored in the database. However, in another embodiment of the present invention, it may be desirable to receive and store only the initial call data. Then, at some later time, the database program will search for and associate additional call data with that number. For example, call data may be stored in a database without additional call data until a personal directory is to be provided to the user. Then, at that time, the database program conducts the search for additional call data to associate with the number.

In another embodiment of the present invention, after a number is received by the database, it is compared to the other numbers within the database and stored with other call information regarding that same number in a party profile. This party profile comprises a phone number as well as additional call data such as the caller's name, address and other such information. The party profile may also contain any of the date, time and duration of all the calls associated with that number. When new call data is received by the database, the database program compares the call data to the existing data, and if a party profile for that number already exists, the new call data is added to the party profile. If a party profile does not exist, the database program will create one and search for additional call data to associate with the number. Once a phone number is in the database and associated with other information such as names and addresses, a subsequent call to or from the same number is then matched within the database, rather than searching exterior databases.

Phone numbers and other call data are stored in the call log database in any order desired. They may be grouped by number as discussed above, or merely stored in the order they were received and later sorted and organized in a more useful manner.

In one embodiment of the present invention, the call data and other information is accessed from the database and displayed as a personal directory. There are several ways in which this call information may be accessed and displayed. In one embodiment of the present intention, this information is printed by the service provider and given to the user in hard copy much like a traditional phone book. However, the personal directory, rather than listing all phone numbers for an area, most of which a user never needs, will only contain numbers that were placed or received form the user's phone.

An embodiment of the method of the present invention can be used to provide a personal directory to the user in electronic form. In this embodiment, the directory is transmitted from the provider to a user's personal computer or PDA. The records may come in any form; for example, on a personal computer it may be desirable to have the directory imported into an existing contacts list like Microsoft Outlook®.

In a further embodiment of the present invention, electronic forms of the directory may be updated with any frequency desired. A user chooses the frequency with which to have their personal directory automatically updated. It is also within the scope of this invention to have the personal directory update continuously. For example, when a user chooses to download the personal directory to their computer or PDA, every time a new number is received in the database, it may be associated with additional call data and transmitted to the computer or PDA for immediate addition to the personal directory already on the device.

The form and organization of the database and the resulting personal directory may be provided to the user in any form chosen by the user or established by the provider. A common method is similar to a regular phone book with entries in alphabetical order and possibly split into separate lists for residential and business calls. The entries may also be listed by time of day or frequency of the calls made to or from that particular phone number. Additionally, some combination of different organizational methods may be employed during the practice of the present invention.

In one embodiment where the numbers are arranged alphabetically, the most frequently called numbers are highlighted so they stand out from the less frequently called numbers. This is accomplished by color-coding the numbers with different colors corresponding to different call frequency. Another possible method of indicating frequently called numbers is to display them in bigger font. The personal directory may also have a list at the beginning or end comprising the most frequently called numbers, so that the user does not have to look through the entire book to find a number they call often.

In one embodiment of the present invention, in addition to organizing the numbers, a filter is used to remove undesirable numbers from the directory. Many numbers are labeled "private" and as such, call information from these numbers is not obtainable. References to such numbers may be removed from the directory before it is delivered to the user. Additionally, numbers from telemarketers and other incoming calls from businesses may not be relevant to a personal telephone directory for home use. By selectively filtering and removing undesirable numbers, the user's personal telephone directory will be more valuable to them.

The foregoing descriptions of the preferred embodiments of the invention have been presented for the purpose of illustration and description and are not intended to be exhaustive or to limit the invention to the precise forms disclosed. Numerous modifications and adaptations thereof will be apparent to those skilled in the art without departing from the spirit and scope of the present invention.

We claim:

1. A method for providing a personal telephone directory, comprising:
   a) receiving, at a telephone network location, telephone call data associated with a telephone call associated with a user's phone;
   b) storing, at a remote location from the user's phone, the call data with call data from other calls associated with the user's phone;
   c) organizing the call data according to a predetermined format at the remote location, wherein the call data is organized with call data from at lest one other telephone number associated with the user; and
   d) allowing the user to access the data, at the remote location, in the form of a personal telephone directory comprising call data from calls made to or from a plurality of the user's telephones, wherein the personal telephone directory in its entirety is accessible to the user;
   wherein organizing the data comprises searching databases for additional information that is associated with the call data and filtering undesirable telephone numbers.

2. The method of claim 1, wherein call data is received for incoming calls.

3. The method of claim 1, wherein call data is received for outgoing calls.

4. The method of claim 1, wherein the call data comprises at least one of:
   the party's telephone number;
   the party's name;
   the date of the call;
   the time of initiation of the call;
   the time of call termination; and
   the duration of the call.

5. The method of claim 1, wherein the call data is compared to information stored in a database to associate additional call data with the phone number.

6. The method of claim 1, wherein the additional call data comprises at least one of:
   a party's name;
   a party's telephone number;
   a party's address; and
   whether the party is residential or business party.

7. The method of claim 1, further comprising storing the call data in a database.

8. The method of claim 1, further comprising storing the call in a central database for multiple users.

9. The method of claim 1, further comprising storing the call data for a length of time.

10. The method of claim 1, wherein the call data is organized alphabetically by name.

11. The method of claim 1, wherein the call data is organized alphabetically by call frequency.

12. The method of claim 1, wherein individual listings are color coded based on call frequency.

13. The method of claim 1, wherein calls without numbers associated with them are not provided in the personal telephone directory.

14. The method of claim 1, wherein the call data is organized by type of contact.

15. The method of claim 1, wherein the call data is organized by a personal preference by the user.

16. The method of claim 1, wherein personal telephone directory information may be accessed using at least one of the following devices:
   a personal digital assistant;
   a cellular phone; and
   a personal computer.

17. The method of claim 16, wherein the call data is stored locally on the device after it is accessed.

18. The method of claim 1, wherein the personal telephone directory may be accessed by printing out the information in paper form.

19. A system for providing a personal telephone directory, comprising:
   a central database storing call data information from telephone calls associated with different telephones of different users; and
   a database manager organizing stored call data information associated with a telephone of a first user into the personal telephone directory for the first user, wherein undesirable telephone numbers are filtered in the organizing process and the personal telephone directory in its entirety is accessible to the first user the personal telephone directory for the user includes call data for a plurality of telephone numbers of the first user.

20. The system of claim 19, further comprising:
   a telephone network switch used to route a telephone call associated with the telephone of the first user, the telephone network switch extracting the call data information during telephone call routing and providing the call data information to the central database.

21. The system of claim 19, wherein the personal telephone directory for the first user is maintained in an electronic form that is available for downloading by the first user.

22. The system of claim 19, wherein the personal telephone directory for the first user is maintained in an electronic form that is available to be produced as a printed publication.

23. The system of claim 19, wherein the database manager searches for additional information that is associated with the call data information to include in the personal telephone directory of the first user.

24. The system of claim 19, wherein the first user chooses how often the personal telephone directory of the first user is updated by the database manager.

25. A computer-readable medium having a program for providing a personal telephone directory, the program comprising the steps of:
receiving telephone call data associated with a telephone call of a telephone of the user;
storing the telephone call data with call data from other calls associated with the telephone of the user;
organizing the call data according to a pre-determined format at a remote location from the telephone of the user and filtering undesirable telephone numbers wherein the call data is organized with call data from at least one other telephone number associated with the user; and
allowing the user to access the data in the form of a personal telephone directory comprising call data from calls made to or from a plurality of telephone of the user; wherein organizing the call data comprises searching databases for additional information that is associated with the call data, wherein the personal telephone directory in its entirety is accessible to the user.

26. The medium of claim 25, wherein the user is allowed to download an electronic copy of the personal telephone directory.

27. The medium of claim 25, wherein the personal telephone directory is maintained in an electronic form that is available to be produced as a printed publication.

28. The medium of claim 25, wherein the user chooses how often the personal telephone directory is updated.

29. The medium of claim 25, wherein a copy of the personal telephone directory may be accessed by a personal communication device of the user and stored locally on the device after the personal telephone directory is accessed.

* * * * *